(12) United States Patent
Sibecas et al.

(10) Patent No.: US 6,904,550 B2
(45) Date of Patent: Jun. 7, 2005

(54) VELOCITY ENHANCEMENT FOR OFDM SYSTEMS

(75) Inventors: Salvador Sibecas, Lake Worth, FL (US); Glafkos Stratis, Lake Worth, FL (US); Celestino Corral, Lake Worth, FL (US); Shahriar Enami, Boynton Beach, FL (US); Gregg Rasor, Lantana, FL (US); Robert Gorday, Wellington, FL (US)

(73) Assignee: Motorola, Inc., Schaumburg, IL (US)

( * ) Notice: Subject to any disclaimer, the term of this patent is extended or adjusted under 35 U.S.C. 154(b) by 112 days.

(21) Appl. No.: 10/331,692

(22) Filed: Dec. 30, 2002

(65) Prior Publication Data

US 2004/0128605 A1 Jul. 1, 2004

(51) Int. Cl.[7] .......................... G01R 31/28; H04J 3/12; H04L 7/00
(52) U.S. Cl. .................. 714/714; 714/715; 370/522; 375/363
(58) Field of Search ................ 714/701, 703, 714/712, 715, 746, 758, 776, 786, 714; 375/224, 225, 265, 341, 362–365, 368; 370/522, 525, 527–529

(56) References Cited

U.S. PATENT DOCUMENTS

| | | | |
|---|---|---|---|
| 6,151,296 A | * | 11/2000 | Vijayan et al. ............. 370/208 |
| 6,327,314 B1 | | 12/2001 | Cimini, Jr. et al. |
| 6,424,678 B1 | * | 7/2002 | Doberstein et al. ......... 375/260 |
| 2002/0004920 A1 | | 1/2002 | Cho et al. ................... 714/704 |
| 2002/0126774 A1 | * | 9/2002 | Harada et al. .............. 375/340 |
| 2002/0196842 A1 | * | 12/2002 | Onggosanusi et al. ...... 375/148 |
| 2003/0031278 A1 | * | 2/2003 | Kang et al. ................. 375/341 |

OTHER PUBLICATIONS

Salvador Sibecas et al;, "On the Suitability of 802.11a/RA for High–Mobility DSRC," Vehicular Technology Conference of IEEE, Apr. 2002.

* cited by examiner

Primary Examiner—Guy J. Lamarre
Assistant Examiner—Cynthia Britt (57) ABSTRACT

An orthogonal frequency division multiplexing (OFDM) transmitter method, consistent with certain embodiments of the present invention arranges OFDM data symbols representing data bits for transmission in a packet. A prescribed pattern of OFDM data symbols are removed (212) and replaced (216) with pilot symbols. The packet is then transmitted (220) to an OFDM receiver that receives the packet (224) and determines a channel correction factor from the pilot pattern. The receiver then estimates a plurality of channel correction factors, one for each of the plurality of OFDM symbols representing data (228) and uses these correction factors to correct the OFDM symbols representing data (232). Arbitrary data are then inserted in place of the pilot symbols (236). The OFDM symbols representing data along with the arbitrary data are then decoded using an error correction decoder that corrects the errors induced by substitution of the pilot symbols for data symbols (240).

59 Claims, 7 Drawing Sheets

FIG. 1

| SUBCARRIER 1 | X | X | S | S | S | S | S | S | S | S | S | S |
|---|---|---|---|---|---|---|---|---|---|---|---|---|
| SUBCARRIER 2 | X | X | S | S | S | S | S | S | S | S | S | S |
| SUBCARRIER 3 | X | X | S | S | S | S | S | S | S | S | S | S |
| SUBCARRIER 4 | X | X | S | S | S | S | S | S | S | S | S | S |
| SUBCARRIER 5 | X | X | S | S | S | S | S | S | S | S | S | S |
| SUBCARRIER 6 | X | X | S | S | S | S | S | S | S | S | S | S |
| SUBCARRIER 7 | X | X | S | S | S | S | S | S | S | S | S | S |
| SUBCARRIER 8 | X | X | S | S | S | S | S | S | S | S | S | S |
| SUBCARRIER 9 | X | X | S | S | S | S | S | S | S | S | S | S |

TIME -------→

*FIG. 2*

| SUBCARRIER 1 | X | X | S | S | S | S | S | X | S | S | S | S |
|---|---|---|---|---|---|---|---|---|---|---|---|---|
| SUBCARRIER 2 | X | X | S | S | S | S | S | S | S | S | S | X |
| SUBCARRIER 3 | X | X | S | S | S | S | X | S | S | S | S | S |
| SUBCARRIER 4 | X | X | S | S | S | S | S | S | S | S | X | S |
| SUBCARRIER 5 | X | X | S | S | S | X | S | S | S | S | S | S |
| SUBCARRIER 6 | X | X | S | S | S | S | S | S | S | X | S | S |
| SUBCARRIER 7 | X | X | S | S | X | S | S | S | S | S | S | S |
| SUBCARRIER 8 | X | X | S | S | S | S | S | S | X | S | S | S |
| SUBCARRIER 9 | X | X | S | X | S | S | S | S | S | S | S | S |

TIME -------→

*FIG. 3*

| SUBCARRIER 1 | X | X | S | X | S | S | S | S | S | S | S | S | S | S | S | S | S | S |
|---|---|---|---|---|---|---|---|---|---|---|---|---|---|---|---|---|---|---|
| SUBCARRIER 2 | X | X | S | S | S | X | S | S | S | S | S | S | S | S | S | S | S | X |
| SUBCARRIER 3 | X | X | S | S | S | S | S | X | S | S | S | S | S | S | S | X | S | S |
| SUBCARRIER 4 | X | X | S | S | S | S | S | S | S | X | S | S | S | X | S | S | S | S |
| SUBCARRIER 5 | X | X | S | S | S | S | S | S | S | S | X | X | S | S | S | S | S | S |
| SUBCARRIER 6 | X | X | S | S | S | S | S | S | S | X | S | S | X | S | S | S | S | S |
| SUBCARRIER 7 | X | X | S | S | S | S | S | S | X | S | S | S | S | S | S | X | S | S |
| SUBCARRIER 8 | X | X | S | S | S | S | X | S | S | S | S | S | S | S | S | S | X | S |
| SUBCARRIER 9 | X | X | S | S | X | S | S | S | S | S | S | S | S | S | S | S | S | S |

TIME -------→

FIG. 4

| SUBCARRIER 1 | X | X | S | S | S | S | S | S | S | S | S | S | X | S | S | S | S | S |
|---|---|---|---|---|---|---|---|---|---|---|---|---|---|---|---|---|---|---|
| SUBCARRIER 2 | X | X | S | S | S | S | S | S | S | S | X | S | S | S | S | S | X | S |
| SUBCARRIER 3 | X | X | S | S | S | S | S | S | X | S | S | S | S | S | X | S | S | S |
| SUBCARRIER 4 | X | X | S | S | S | S | X | S | S | S | S | S | X | S | S | S | S | S |
| SUBCARRIER 5 | X | X | S | S | X | S | S | S | S | S | X | S | S | S | S | S | S | S |
| SUBCARRIER 6 | X | X | S | S | S | S | S | S | S | X | S | S | S | S | S | S | S | X |
| SUBCARRIER 7 | X | X | S | S | S | S | X | S | S | S | S | S | S | S | S | X | S | S |
| SUBCARRIER 8 | X | X | S | S | S | X | S | S | S | S | S | S | S | X | S | S | S | S |
| SUBCARRIER 9 | X | X | S | X | S | S | S | S | S | S | S | S | S | S | S | S | S | S |

TIME -------→

VELOCITY ENHANCEMENT FOR OFDM SYSTEMS

FIELD OF THE INVENTION

This invention relates generally to the field of Orthogonal Frequency Division Multiplexing (OFDM). More particularly, this invention relates to use of pilot signals in an OFDM system to enhance error performance, particularly when the OFDM system is used in a mobile environment.

BACKGROUND OF THE INVENTION

In July 1998, the IEEE standardized OFDM as the basis for a 5 Ghz physical layer (PHY) for wireless local area networks (WLANs). This standard is referred to as IEEE 802.11a and provides for data transmission at rates between 6 and 54 Mbps. This standard is designed for use in Local Area Networks (LANs) to communicate data in a quasi-static indoor environment. That is, although the network's nodes may move about and the environment may change somewhat (for example, by virtue of movement of people and furniture within the range of the network), such movements are quite slow when compared with the packet size used in the OFDM system.

A modification of this standard has been proposed for the Roadside Access (RA) physical layer referred to as 802.11a/RA, with the main difference being a reduction by a factor of two in the serial bit rate for 802.11a/RA. Although the two systems operate in a similar manner, the RA system environment is dramatically different in that it is proposed for use in association with moving automobiles (mobile units) communicating with stationary access points or other mobile units. As currently proposed, 802.11a/RA and similar OFDM systems intended for use in dynamic environments will suffer from errors induced by phase noise and Doppler frequency spreads.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 2 illustrates a pilot arrangement as used in IEEE 802.11a.

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding elements in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program", as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

In OFDM communication systems, a high data rate stream of data is converted to a number of slower data rate streams that are transmitted in parallel simultaneously over a number of orthogonal subcarriers. Because the symbol duration increases for the lower-rate parallel subcarriers, the relative amount of dispersion in time caused by multipath delay spread is decreased. Also, intersymbol interference (ISI) may be reduced or eliminated by introduction of a guard interval of appropriate length to every OFDM symbol.

Figure 1:
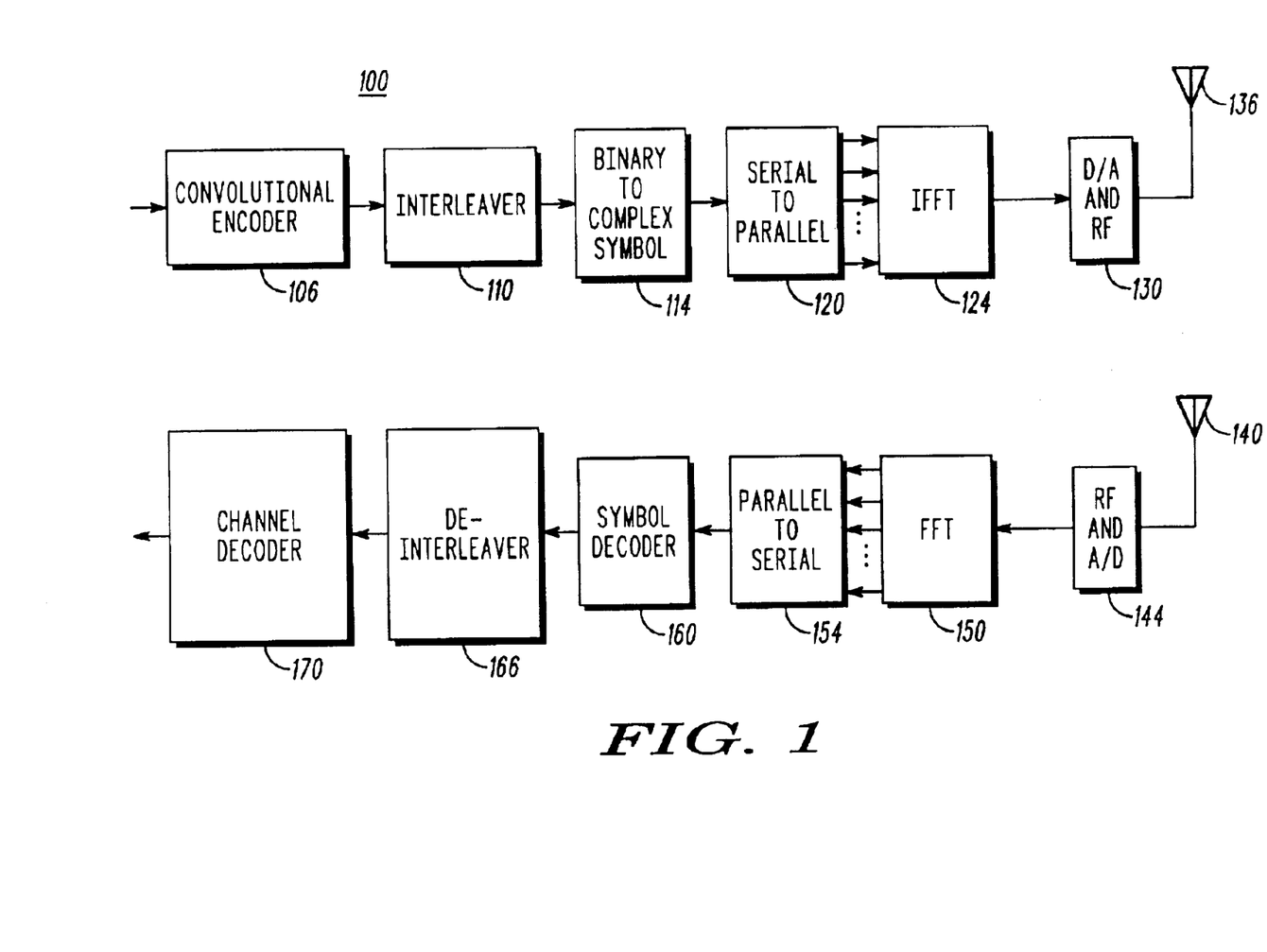
FIG. 1 is a high level block diagram of an OFDM transmitter and receiver system.

One simplified embodiment of an OFDM system 100 for transmission and reception of data is illustrated in FIG. 1. For applications involving transmission of analog signals such as speech and video, additional circuitry can be used to convert from analog signals to digital signals and vice versa, as will be understood by those skilled in the art. Incoming data to be transmitted are encoded by a convolutional encoder 106 to add redundancy to the data to facilitate error detection and correction. The encoded data are passed to an interleaver 110 which rearranges the data to help assure that errors introduced during transmission are spread out to avoid multiple errors in adjacent data bits (which are more difficult or impossible to correct). The output of interleaver 110 is coupled to a binary to complex symbol mapper 114 that maps data bits to symbols on a complex two-dimensional plane. The data can be encoded as, for example, binary phase shift keying (BPSK) data, quadrature phase shift keying (QPSK), sixteen symbol quadrature amplitude modulation (16QAM) or sixty four symbol quadrature amplitude modulation (64QAM).

A collection of symbols are rearranged from serial data to parallel data at serial to parallel converter 120 and the parallel data symbols are coupled as inputs to an inverse Fast Fourier Transformer (IFFT) 124 that can be implemented using a digital signal processor (DSP). This produces a signal which is an inverse FFT of the collection of symbols provided at the input and effectively represents a collection of simultaneous subcarriers that are passed to a digital to analog converter (DAC or D/A) and radio frequency (RF) transmitter circuit 130. IFFT 124 converts the operation of OFDM system 100 from the frequency domain to the time domain. Circuit 130 modulates the subcarriers to a desired frequency band for transmission over antenna 136.

At the receiver side, an antenna 140 receives the incoming RF signal. The RF signal is converted to baseband and then to digital serial data at RF and A/D (analog to digital converter) circuit 144. This serial data are processed by a Fast Fourier Transformer (FFT) 150 (which also may be implemented in a digital signal processor) to produce the multiple subcarrier signals as output. These subcarriers are converted from parallel to serial data at parallel to serial converter 154. The data then proceeds to a symbol decoder 160 that maps received symbols back to binary data. The data are then de-interleaved at 166 to undo the interleaving and then passed to a channel decoder 170, such as a hard decision or soft decision Viterbi decoder, that decodes the convolutionally encoded data to produce output data.

The transmitter and receiver arrangement illustrated in FIG. 1 should be considered exemplary, since many variations and modifications are possible within the scope of the present invention, including but not limited to, rearrangement of certain of the functional blocks, addition of functional blocks and modification of the functional blocks.

The OFDM system of IEEE 802.11a and as currently proposed for IEEE 802.11a/RA arranges data in packets. A contention process is utilized whenever a transmitter wishes to capture the channel to transmit a packet. A set of pilot symbols is transmitted within each data packet to establish the characteristics of the channel between transmitter and receiver. This is implemented by sending a known pilot symbol (e.g., any known value in the constellation of symbols available for transmission) on each subcarrier from the transmitter to the receiver near the start of the packet. This known pilot symbol is then received at the receiver and is used to generate a correction factor used for each subcarrier to correct the incoming data. Since the IEEE 802.11a standard was developed for a quasi-static environment, it is assumed that there will be no changes in the channel characteristics from the beginning to the end of the packet. Thus, the pilots can be used to calculate correction factors to be used for correction of all data symbols throughout the entire packet.

Figure 2:
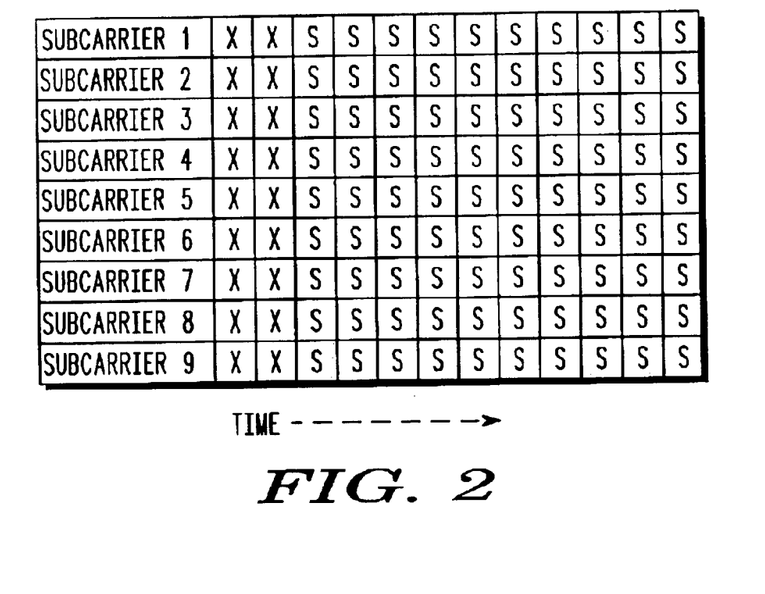

The pilot patterns for IEEE 802.11a and IEEE 802.11/RA can be viewed (ignoring packet overhead and truncating the number of subcarriers and OFDM symbols per packet) as an arrangement as depicted as the example shown in FIG. 2. In this arrangement, the subcarrier frequencies are arranged as rows in this chart while each OFDM symbol transmitted is illustrated as a column with time increasing from left to right. Individual blocks in the array represent either a data symbol or pilot symbol transmitted at a particular symbol interval over a particular subcarrier. The collection of data symbols transmitted at a given symbol interval over all of the subcarriers constitutes an OFDM symbol. The terms "data symbol" or "OFDM data symbol" as used herein are intended to mean the symbol transmitted over a single subcarrier at a single symbol interval, and is intended to distinguish over an OFDM symbol that means the collection of "data symbols" transmitted simultaneously over the collection of subcarriers. An X shown in the chart represents a pilot symbol while an S represents an OFDM data symbol. In accordance with the standards, two pilot symbols are transmitted at the beginning of the packet over each of 64 subcarriers (only nine shown for simplicity). The number of symbol time periods (blocks in the horizontal direction) depends upon the packet size selected and is truncated in this drawing for simplicity. After the two pilot symbol periods, OFDM data symbols occupy the remainder of the packet.

In one proposal for dealing with the errors introduced in a mobile environment where the environment no longer conforms to the quasi-static assumption of IEEE 802.11a, the packet length is shortened (e.g., to 63 bytes) so that the pilots are transmitted with much higher frequency than usual. While this effectively reduces the size of the packet relative to the speed of changes in the environment, it also produces a great number of negative effects. By reducing the size of packets, the number of packets needed to transmit a given amount of data increases. The transmitting station must, therefore, capture the channel on a more frequent basis to transmit more packets to convey a given amount of data (assuming more than one packet is needed to convey the desired information). IEEE 802.11a is a contention system using Channel Sense Multiple Access with Collision Detection (CSMA/CD) in which transmitting stations have to contend for use of the channel. A smaller packet size results in more collisions, greater delay and lower throughput. Moreover, all packets, independent of their size, use the same amount of overhead further reducing the efficient use of the channel. It would be a more efficient use of the channel if larger packet sizes were used (IEEE 802.11a allows packets up to 4096 bytes). In addition to causing delays, the use of small packets inhibits the protocol from incorporating the RTS (Request To Send) CTS (Clear To Send) functions available in the 802.11 MAC (Medium Access Control) to avoid collisions, especially under heavy loading.

The pilot structure used in the PHY layer to correct the phase and amplitude variations introduced by the communication channel cannot be used to accurately correct large Doppler frequency spreads. In other words, the 802.11a pilot structure only works when the impulse response of the channel is almost constant during the length of the packet sent or when the packet length is much less than the coherence time of the channel. The problem is compounded when the RA version is used, since for a given packet length, modulation level and code rate, it takes twice the amount of time to transmit the message.

In accord with certain embodiments consistent with the present invention, certain of the data can be sacrificed to introduce additional pilots into the packet. That is, pilot symbols in certain strategically located areas of the packet directly replace data symbols. These additional pilots are used to enhance the ability of the system to deal with a rapidly changing channel without need to reduce packet size. Although substitution of pilot symbols for data symbols induces errors into the data, such errors can be induced at a rate that is effectively dealt with by the redundancy encoding and thus correctable. The net throughput can be substantially enhanced over the current standard without significant modification to a standard IEEE 802.11a system (or similar OFDM system).

Figure 3:
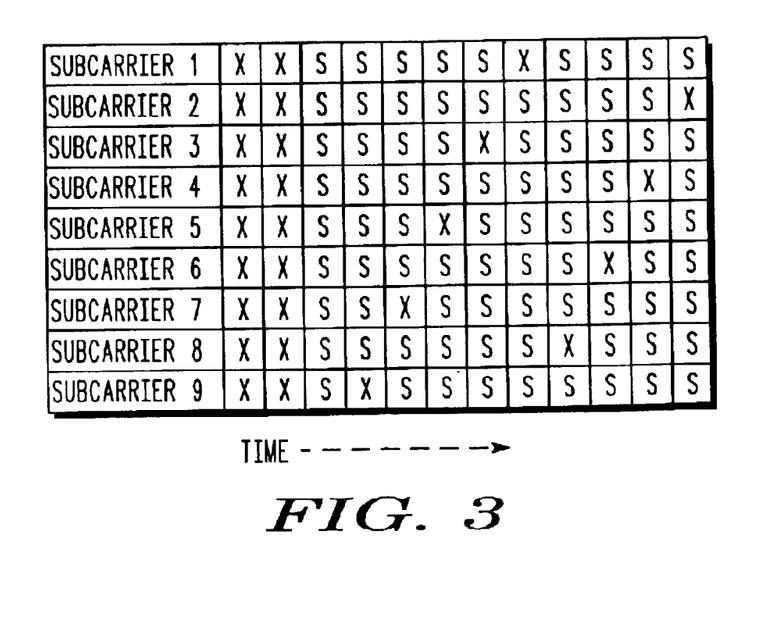
FIG. 3 illustrates a pilot arrangement consistent with certain embodiments of the present invention.
Figure 4:
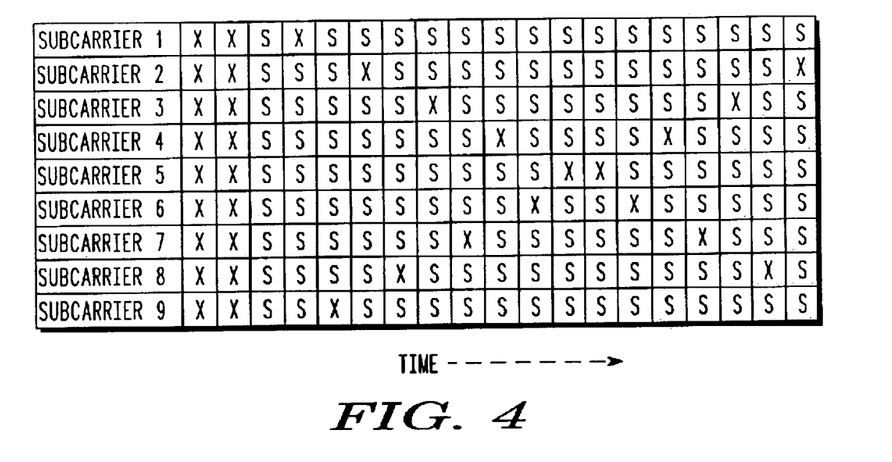
FIG. 4 illustrates another pilot arrangement consistent with certain embodiments of the present invention.
Figure 5:
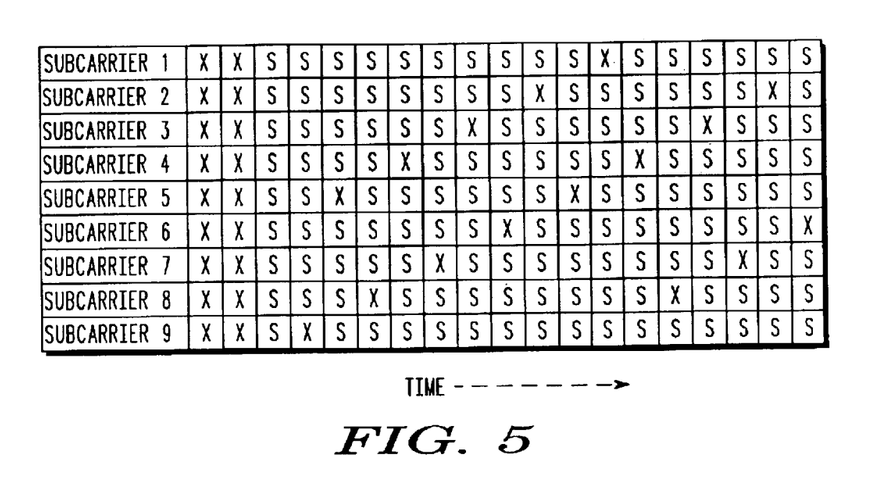
FIG. 5 illustrates another pilot arrangement consistent with certain embodiments of the present invention.

FIG. 3 illustrates one arrangement of pilot symbol substitutions consistent with certain embodiments of the present invention. In this embodiment a linear arrangement of symbols is selected for substitution with pilots. Again, an X represents a pilot symbol while S represents standard OFDM symbols carrying data. Pilot symbols are substituted for OFDM data symbols in an arrangement that permits the error correction to correct the errors that this introduces, but adds additional pilots to facilitate more accurate correction of the channel over the duration of a longer packet (e.g., a packet of 4000 plus bytes). The linear arrangement selected in this figure is but one possible arrangement. Other linear arrangements are illustrated in FIG. 4 and FIG. 5. These linear arrangements use a different slope and interleaved starting points for the lines. Other arrangements, linear and non-linear, will occur to those skilled in the art upon consideration of the present invention. In fact, subject to certain constraints to be described later, even random patterns can show improvement in packet error rates in high scattering environments over the standard two pilot arrangement of IEEE 802.11a.

The pilots in the first two symbol times are required in the standards and may still be utilized in this embodiment if desired. In order to understand how these new pilots are used to create correction factors, consider the following example. Those skilled in the art will also understand that other methods of estimating the correction factors from the transmitted pilot symbols can be used without departing from the present invention.

Figure 6:
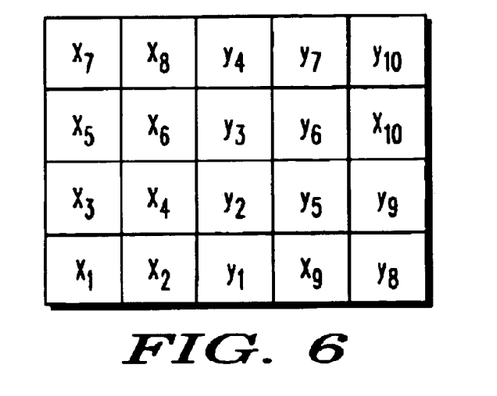
FIG. 6 illustrates how correction factors are constructed in a manner consistent with certain embodiments of the present invention.

With reference to FIG. 6, consider a small grid of symbols surrounding certain of the pilot symbols. In FIG. 6, the first two symbol locations contain the conventional pilot symbols. At the receiver, an interpolation process (e.g., linear interpolation, a Wiener filter process or any other suitable estimation process) can be used to derive a correction factor that is normally considered static and good for the entire packet for each subcarrier. Let this correction factor (as well as other derived correction factors) be represented by subscripted Y values in the drawing. In accordance with certain embodiments consistent with the present invention, this correction factor is refined where possible by use of the additional transmitted pilots.

The correction factors, in general, may be considered to be complex transfer functions which define the effects of the channel such that ideally:

Transmitted symbol=(Received symbol)(correction factor)

A different theoretically ideal correction factor would be desirable for each symbol transmitted in each symbol period for each subcarrier. Of course, this ideal situation is unlikely to be absolutely achieved. In IEEE 802.11a, this ideal is approximated by the channel characteristics at each subcarrier computed at the beginning of the packet and is assumed static. In accordance with certain embodiments consistent with the present invention, this approximation is refined throughout the packet by use of additional pilot symbols transmitted in place of OFDM data symbols.

Although the assumption that a channel is not static for the duration of a packet may not be valid when the characteristics of the channel are not quasi-static, one can assume that the channel is reasonably static over shorter periods of time and over short ranges of frequency. This principle is used to estimate correction factors for correction of the effects of the channel in accordance with certain embodiments of the invention. Thus, for example, each of the correction factors in the first symbol interval following the starting pilot symbols are generated as an interpolation of the results of transmitting the two pilot symbols. Therefore, $Y_1$ is generated by computing the correction factor from received pilots $X_1$ and $X_2$, $Y_2$ is computed from $X_3$ and $X_4$, $Y_3$ is computed from $X_5$ and $X_6$, and $Y_4$ is computed from $X_7$ and $X_8$. For IEEE 802.11a, these correction factors would then be used throughout the length of the packet.

In accordance with certain embodiments consistent with the present inventions, since additional data are available from received pilots $X_9$ and $X_{10}$, that data can be used to refine the estimates in later symbols and even in the first data symbols if desired. By way of example, and not limitation, consider the correction factor $Y_1$. This correction factor might be better approximated by an interpolation between received pilot symbols $X_2$ and $X_9$ than to simply approximate it by received pilot symbols $X_1$ and $X_2$, in certain embodiments. Since the channel may not be static at this subcarrier frequency, the received pilot $X_9$ or the received pilot $X_2$ might be a better estimate of the channel characteristics for correction factor $Y_1$, so either could be used, with presumably similar results depending upon the channel change.

Since the channel characteristics can reasonably be assumed to be relatively invariant between adjacent subcarriers in a single symbol interval, received pilot $X_9$ may be used to compute an approximation for $Y_5$, or $Y_5$ might be derived from an interpolation with values obtained from received pilot symbol $X_{10}$. Similarly, it may be assumed that the channel may be relatively invariant between adjacent symbol intervals. These assumptions lead to any number of possibilities for interpolation of the correction factors based upon available received pilot information that exists, several of the more likely of which are outlined in TABLE 1 below:

TABLE 1

| Correction Factor: | Derived from: |
| --- | --- |
| $Y_1$ | $X_9$ or |
|  | $X_1$ and $X_2$ or |
|  | $X_2$ and $X_9$ or |
|  | $X_1$ and $X_2$ and $X_9$ |
| $Y_2$ | $X_3$ and $X_4$ or |
|  | $X_4$ and $X_9$ or |
|  | $X_3$ and $X_4$ and $X_9$ |
| $Y_3$ | $X_5$ and $X_6$ |
| $Y_4$ | $X_7$ and $X_8$ |
| $Y_5$ | $X_9$ and $X_{10}$ or |
|  | $X_9$ and $X_4$ or |
|  | $X_3$ and $X_4$ or |
|  | $X_9$ or |
|  | $X_{10}$ |
| $Y_6$ | $X_5$ and $X_6$ or |
|  | $X_6$ and $X_{10}$ or |
|  | $X_5$ and $X_6$ and $X_{10}$ |
|  | or $X_{10}$ |
| $Y_7$ | $X_7$ and $X_8$ or |
|  | $X_7$ and $X_8$ and $X_{10}$ |
| $Y_8$ | $X_9$ and $X_{10}$ |
| $Y_9$ | $X_9$ and $X_{10}$ or |
|  | $X_9$ or |
|  | $X_{10}$ or |
| $Y_{10}$ | $X_{10}$ or |
|  | $X_7$ and $X_8$ and $X_{10}$ |

The above approximation possibilities are derived from a coherent bandwidth and/or a coherent time channel approximation. These approximations essentially mean that over small changes in bandwidth and/or small changes in symbol time, the channel can be approximated as constant. By reducing the amount of time and/or bandwidth between reference points obtained by insertion of pilot symbols, the approximation improves. By use of the additional pilot symbols as described herein, the approximation clearly improves over the initial approximation of a static channel for the packet duration. This technique can be used in accordance with embodiments consistent with the invention to refine correction factors in a localized region about the newly added pilot symbols to enhance the channel approximation and thus improve performance in a mobile environment or other environment where the static channel approximation is unsuitable.

The coherent bandwidth channel approximation can generally be applied to adjacent frequency bands and can often be applied across several frequency bands occupied by subcarriers with a reasonable degree of certainty that the channel has not changed dramatically. Similarly, the coherent time channel approximation can often be applied across several symbol intervals (e.g., at least two or three) with a reasonable degree of certainty that the channel has not changed significantly (assuming the Doppler frequency spread is not too great). The degree to which these approximations hold depend upon a number of factors such as the amount of scattering effect, the Doppler frequency shift, etc. Generally speaking, these approximations degrade as the channel degrades, so that closer pilot symbol spacing (in time and frequency) is needed for poorer channels than for channels that more closely approximate a static environment. This spacing, however, should take into account the number of added errors that can be readily corrected.

One simplified version of the process for interpolating correction factors is exemplified in TABLE 2 below. In this table, the coherent time and coherent bandwidth channel approximations are used in a manner that simplifies calculations.

TABLE 2

| Correction Factor: | Derived from: |
| --- | --- |
| $Y_1$ | $X_1$ and $X_2$ |
| $Y_2$ | $X_3$ and $X_4$ |
| $Y_3$ | $X_5$ and $X_6$ |
| $Y_4$ | $X_7$ and $X_8$ |
| $Y_5$ | $X_9$ |
| $Y_6$ | $X_{10}$ |
| $Y_7$ | $X_{10}$ |
| $Y_8$ | $X_9$ |
| $Y_9$ | $X_{10}$ |
| $Y_{10}$ | $X_{10}$ |

Other schemes for approximating and interpolating the channel correction factors will occur to those skilled in the art upon consideration of the present teaching without departing from the present invention. In the tables above, when a correction factor is derived from two or more received pilots, an interpolation process such as linear interpolation, quadratic interpolation, curve fitting or Wiener filtering is used to estimate an intermediate value of the channel transfer function from the known data points. When the correction factor is derived from only a single received pilot, the correction factor is derived by determining what transfer function represents the channel for a particular pilot symbol, which when applied to the received data will yield the known input value.

The pattern described above for selection of data symbols for replacement by pilot symbols should not be considered limiting; however a linear selection scheme does permit a comparatively straightforward mechanism for computing how many data symbols can be replaced by pilots. The term linear, as used herein implies that connecting the pilot locations by drawing a line though the pilot locations creates a straight line. The maximum number of errors that can be introduced without significant system performance degradation determines the bounds of the slope of that line.

By using a 2-D generalization of pilot-symbol assisted modulation, known pilot symbols can be placed in locations within the matrix originally occupied by data symbols. In the receiver, these pilot symbols are removed and after 2-D interpolation and correction, random data symbols are used to replace the pilots. This procedure differs from other assisted pilot modulation methods in that at the receiver data symbols are substituted for the transmitted pilots and used as part of the original message. In order to reduce the number of intentional errors generated by the superimposed pilots, a minimal number of pilot symbols should preferably be used.

In the preferred embodiment, the pilot symbols are replaced in the receiver with random or equivalently, pseudorandom, data symbols. However, the pilot symbols could equivalently be replaced with any data symbol, including without limitation, a repeating data symbol, a systematic sequence of data symbols, or any other symbol without departing from the present invention. For purposes of this invention, the term "arbitrary" is intended to embrace the substituted symbol and means any guessed symbol that is substituted (i.e., a substitution made without knowledge of the correctness of the substitution), without regard for whether it is selected using a random process or any other selection process.

The received pilot symbols can be seen as samples of the 2-D stochastic signal G(f;t). These samples have to be placed close enough in order to satisfy the sampling theorem and avoid aliasing. Thus, the minimum separation $M_t$ of pilot symbols in time may be expressed as:

$$M_t < \frac{1}{2 f_{Drel}\left(1 + \frac{T_G}{T}\right)} \qquad \text{Equation 1}$$

The minimum separation $M_f$ in subcarriers of pilot symbols may be expressed as:

$$M_f < \frac{T}{T_G} \qquad \text{Equation 2}$$

Where:
T=the effective symbol length=$NT_S$ where $T_S$ is the sampling period of the system and N is the number of subcarriers.
$T_G$ is the length of cyclic prefix (guard interval).
The total symbol length=$T+T_G$.
$F_{Drel}$=the relative Doppler frequency.

The linear pattern of pilot symbols shown in FIGS. 3, 4 and 5 should not be considered limiting since many other patterns of pilot symbols could be used. Moreover, although there is preferably only a single pilot symbol substitution per symbol interval (as illustrated), this should also not be considered limiting since the boundary is determined by how many and what type of errors can be tolerated by the error correction encoding and decoding system in use along with the channel conditions being addressed. Since the substitution of pilot symbols for OFDM data introduces errors, it may be desirable to minimize the number of pilot symbols used under a given set of circumstances. In one embodiment, the pilot symbol pattern can be selected from a palette of pilot symbol patterns either in accordance with a random selection process or in accordance with a selection process based upon any suitable criterion. By way of example, and not limitation, patterns with higher density of pilot symbols can be selected when high-speed Doppler effects are anticipated or detected, and lower density of pilot symbols used when lower speed Doppler effects are anticipated or detected. In other examples, the pilot symbol pattern can be selected and refined to achieve optimal performance in a given environment, based upon a receiver's error rate or some other criteria. Simulation results have shown that even randomly selected pilot patterns (within the constraints of $M_f$ and $M_t$ above) can provide significant improvement over the standard IEEE 802.11a pilot structure.

A simpler, but possibly less efficient method, that might be used to identify which pilot pattern was sent, is based on the message length. In this embodiment, the pilot pattern used will depend on the message size. After decoding, the LENGTH field in the IEEE 802.11a packet structure can be read and the receiver will be able to identify the pilot structure sent based upon the length of the message. Other criteria will occur to those skilled in the art. The pattern selected from the palette of available patterns can be conveyed from transmitter to receiver using the service data bits defined in the IEEE 802.11a specification.

Figure 7:
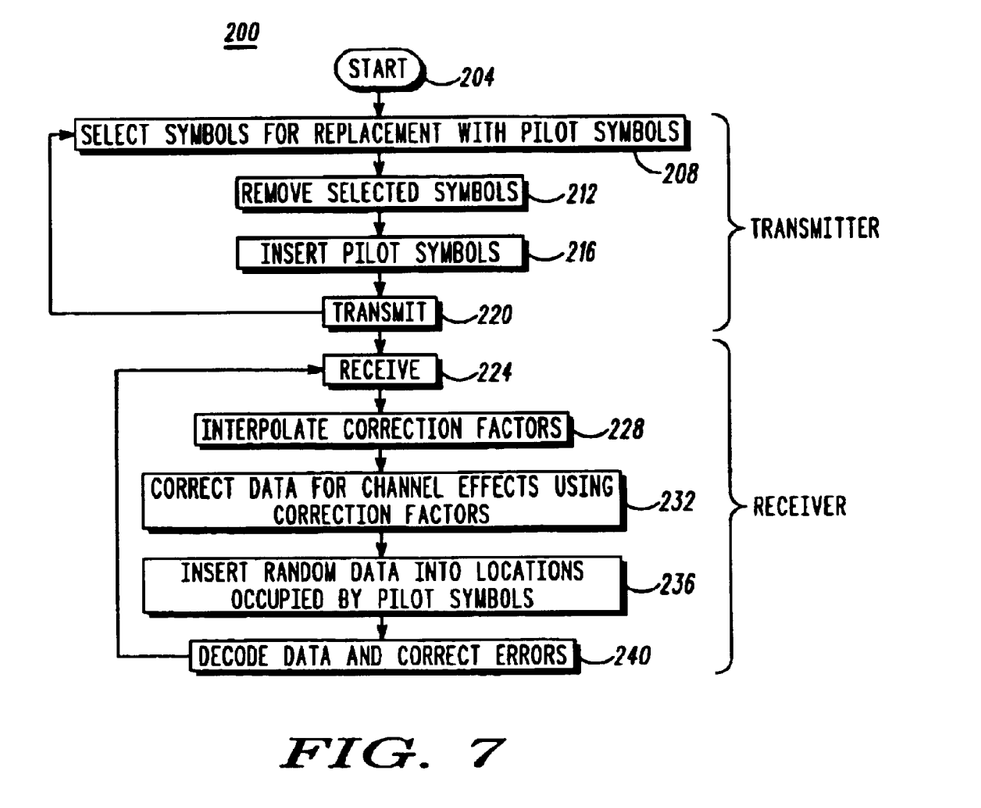
FIG. 7 is a flow chart describing one embodiment of a process consistent with certain embodiments of the present invention.

A process 200 consistent with certain embodiments of the present invention is illustrated in flow chart form in FIG. 7 starting at 204. At 208, symbols are selected in accordance with a particular pattern for replacement with pilot symbols. The selected pattern can be predefined for all cases if desired in which case 208 is carried out only once at system design. Otherwise, the particular selected pattern can be selected based on any desired selection criterion. This pattern should then be conveyed to the receiver (for example, using the sixteen service data bits that are reserved in the packet structure). At 212, the appropriate OFDM symbols are removed and replaced at 216 by pilot symbols and the resulting packet of data and pilot symbols is transmitted at 220. Control then passes back to 208 (or 212) for processing the next packet.

The transmitted packet is received at 224 and, the information defining a given pattern of pilots is received and used to determine which of the symbols are pilot symbols. At 228, correction factors are determined by estimation of the correction factors using an interpolation or other estimation method. The received data symbols are then corrected by the estimate made for the channel effects using the correction factors at 232. The data locations containing pilot patterns are then filled with data, for example, an arbitrary or random selection of data from the available data symbols currently in use at 236.

Removal of the data and substitution of pilots can be carried out with equivalence anywhere in the transmitter path—even at the data bit level, since the pilot may simply be a known segment of data bits—without departing from the present invention, and when the substitution of pilot symbols for data symbols is discussed throughout, this should be interpreted to mean an equivalent substitution anywhere in the transmitter path. Similarly, replacement of the pilot symbols with random or arbitrary data can be carried out anywhere in the receive path equivalently. When the substitution of arbitrary data for pilots is discussed throughout, this should be interpreted to mean an equivalent substitution anywhere in the receiver path.

Without limiting the invention, the basic process according to certain embodiments as exemplified by FIG. 7 can be summarized as follows: An orthogonal frequency division multiplexing (OFDM) method consistent with certain embodiments of the present invention arranges OFDM data symbols representing data bits for transmission in a packet. A prescribed pattern of OFDM data symbols are removed at 212 and replaced at 216 with pilot symbols. The packet is then transmitted at 220 to an OFDM receiver that receives the packet at 224 and determines a channel correction factor from the pilot pattern. The receiver then estimates a plurality of channel correction factors, one for each of the plurality of OFDM symbols representing data at 228 and uses these correction factors to correct the OFDM symbols representing data at 232. Arbitrary (preferably random) data are then inserted in place of the pilot symbols at 236. The OFDM symbols representing data along with the arbitrary data are then decoded using an error correction decoder that corrects the errors induced by substitution of the pilot symbols for data symbols at 240.

The arbitrary or random data symbols that are inserted in place of the data location occupied by the pilot will often or usually be incorrect. Depending upon the number of symbols in the constellation in use, the odds of having correct data in any particular bit location could be as high as 50% (for simple PSK using two symbols per constellation). With higher density constellations, the odds of any bit location having an error increases. If the density in time and subcarrier frequency is selected properly when determining where to place the pilot symbols, the decoder will be able to correct the data errors induced by dropping data in favor of pilots. So, the data are passed to the data decoder at 240 where the data are decoded and the errors are corrected. Control then passes back to 224 for processing of the next packet.

Figure 8:
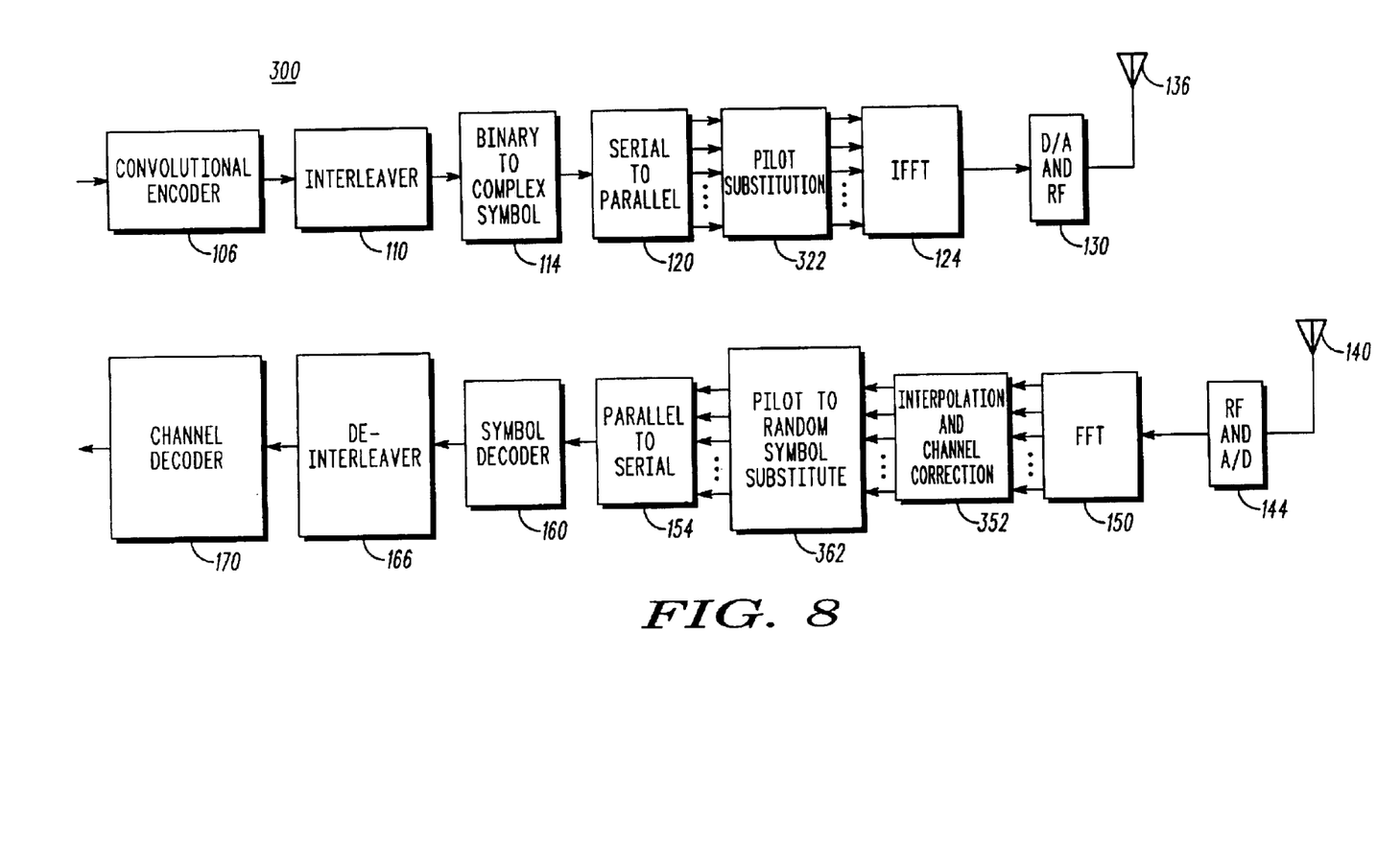
FIG. 8 is a high level block diagram of an OFDM transmitter and receiver using pilot substitution in a manner consistent with certain embodiments of the present invention.

One embodiment of an OFDM system 300 consistent with certain embodiments of the present invention is illustrated in FIG. 8. Incoming data to be transmitted are encoded by a convolutional encoder 106 to add redundancy to the data to facilitate error detection and correction. The encoded data are passed to an interleaver 110 which rearranges the data to help assure that errors introduced during transmission are spread out across multiple subcarrier frequencies to avoid multiple errors in adjacent data bits (which are more difficult or impossible to correct) when narrowband interference is encountered. The output of interleaver 110 is provided to a binary to complex symbol converter 114 that maps data bits to symbols on a complex two-dimensional plane. Preferably, Gray coding is used in the mapping of bits into symbols so that adjacent symbols differ by only one bit. The data can be encoded as, for example, binary phase shift keying (BPSK) data, quadrature phase shift keying (QPSK), sixteen symbol quadrature amplitude modulation (16QAM) or sixty four symbol quadrature amplitude modulation (64QAM). Data symbols are rearranged from serial data to parallel data at serial to parallel converter 120. These parallel data symbols are then acted on by pilot substitution block 322 which substitutes pilot symbols for data symbols according to a pattern that has been selected. The modified parallel data symbols are then provided as inputs to an inverse Fast Fourier Transformer (IFFT) 124 that can be implemented using a digital signal processor (DSP). This produces a signal which is an inverse FFT of the collection of symbols provided at the input and effectively represents a collection of simultaneous subcarriers that are passed to a digital to analog converter (DAC or D/A) and radio frequency (RF) transmitter circuit 130. Circuit 130 modulates the subcarriers to a desired frequency range for transmission over antenna 136. The data are arranged in packets as previously described and now contains additional pilots inserted in place of data. The data packet may also contain an indication as to which pilot pattern was selected. Although this exemplary system inserts the pilot symbols between the serial to parallel converter 120 and the IFFT 124, the pilot symbols could have equally well and equivalently been inserted at an earlier point in the transmitter chain without departing from the invention.

At the receiver side, an antenna 140 receives the incoming RF signal, converts it to baseband and then converts it to digital serial data at RF and A/D circuit 144. This serial data are processed by a Fast Fourier Transformer (FFT) 150 (which also can be implemented in a digital signal processor) to produce the multiple subcarrier signals as output. The output of the FFT 150 is then adjusted by block 352, which serves as a channel estimator and channel corrector. Block 352 receives the information that defines the pilot pattern (if present) and creates channel correction data for each transmitted OFDM symbol by interpolation or otherwise estimating the correction factors to be used for each symbol. The output is a collection of corrected subcarriers. In the locations where the data was deleted in favor of pilot patterns, arbitrary data such as random data are inserted at pilot to random symbol inserter 362 which then sends the subcarriers and arbitrary (e.g., random) symbols to be converted from parallel to serial data at parallel to serial converter 154. The data then proceeds to a symbol decoder 160 that maps received symbols back to binary data. The data are then de-interleaved at 166 to undo the interleaving and then passed to a channel decoder 170, such as a soft decision or hard decision Viterbi decoder, that decodes the convolutionally encoded data to produce output data.

It should be noted that the pilot substitution function shown as 322 can be carried out in other locations in the transmitter chain, generally anywhere between encoder 106 and IFFT 124, without departing from the invention. Similarly, the Pilot to random symbol substitution of block 362 can be carried out anywhere in the receiver chain between the FFT function 150 and the channel decoder 170, without departing from the invention. Other modifications will occur to those skilled in the art upon consideration of the present teaching.

In order to reduce the amount of computation performed at the receiver, the pilot pattern can be made adaptive. For example, if the unit is operating in an indoor quasi-static condition, the system could use the standard IEEE 802.11a structure. However, if the unit operates in an outdoor mobile environment, which is the typical situation for DSRC (Dedicated Short Range Communications), the system will superimposed a linear pilot structure into the 802.11a/RA PHY layer. In order for the receiver to take advantage of the superimposed pilots and improve the PER performance, it needs to know which pilot structure the access point is using. Thus, the transmitter has to pass this information to the receiving unit located inside the vehicle.

Figures 9, 10:
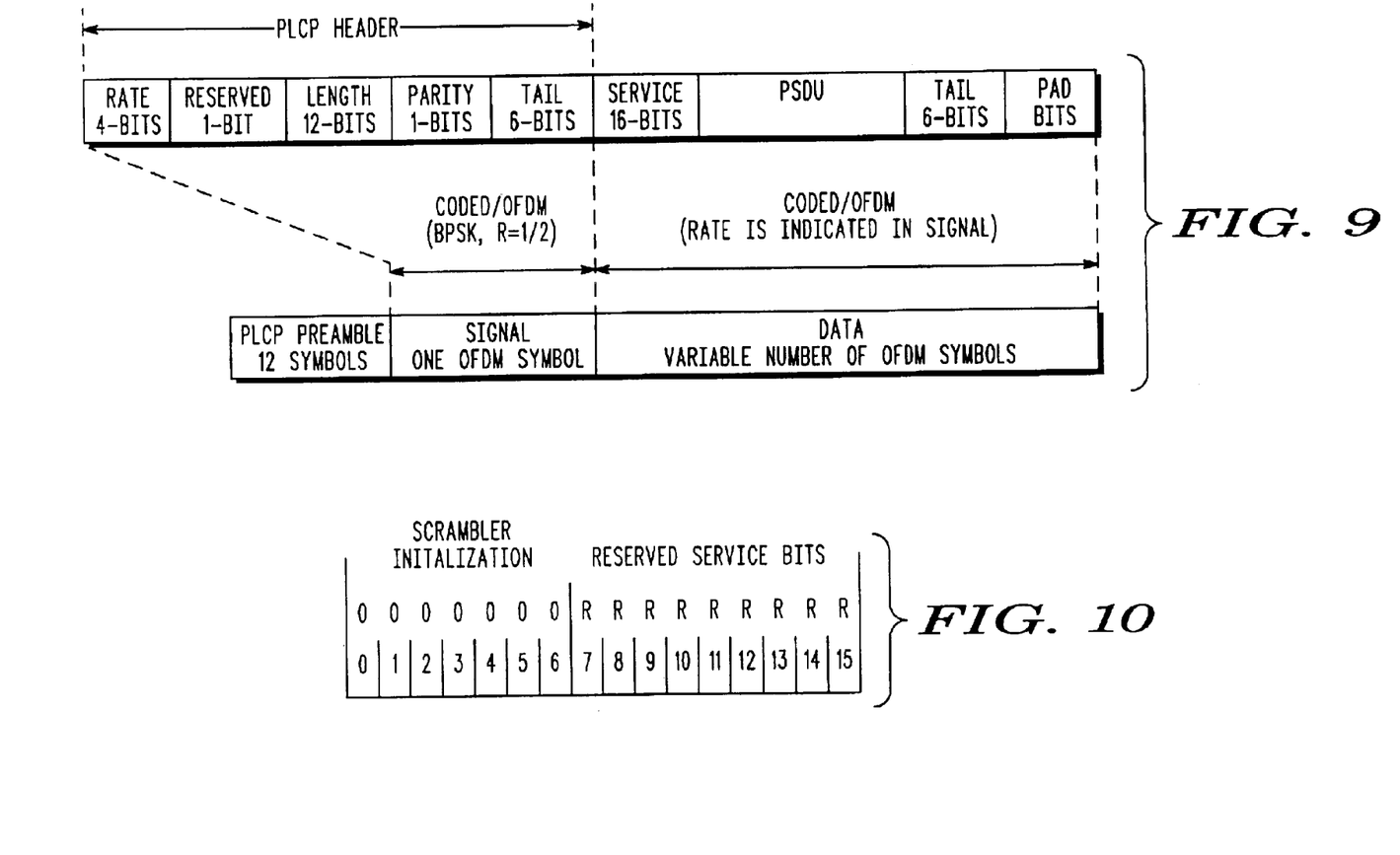
FIG. 9 is a diagram of an IEEE 802.11a physical layer packet.
FIG. 10 is diagram detailing the SERVICE field in an IEEE 802.11a physical layer packet.
Figure 11:
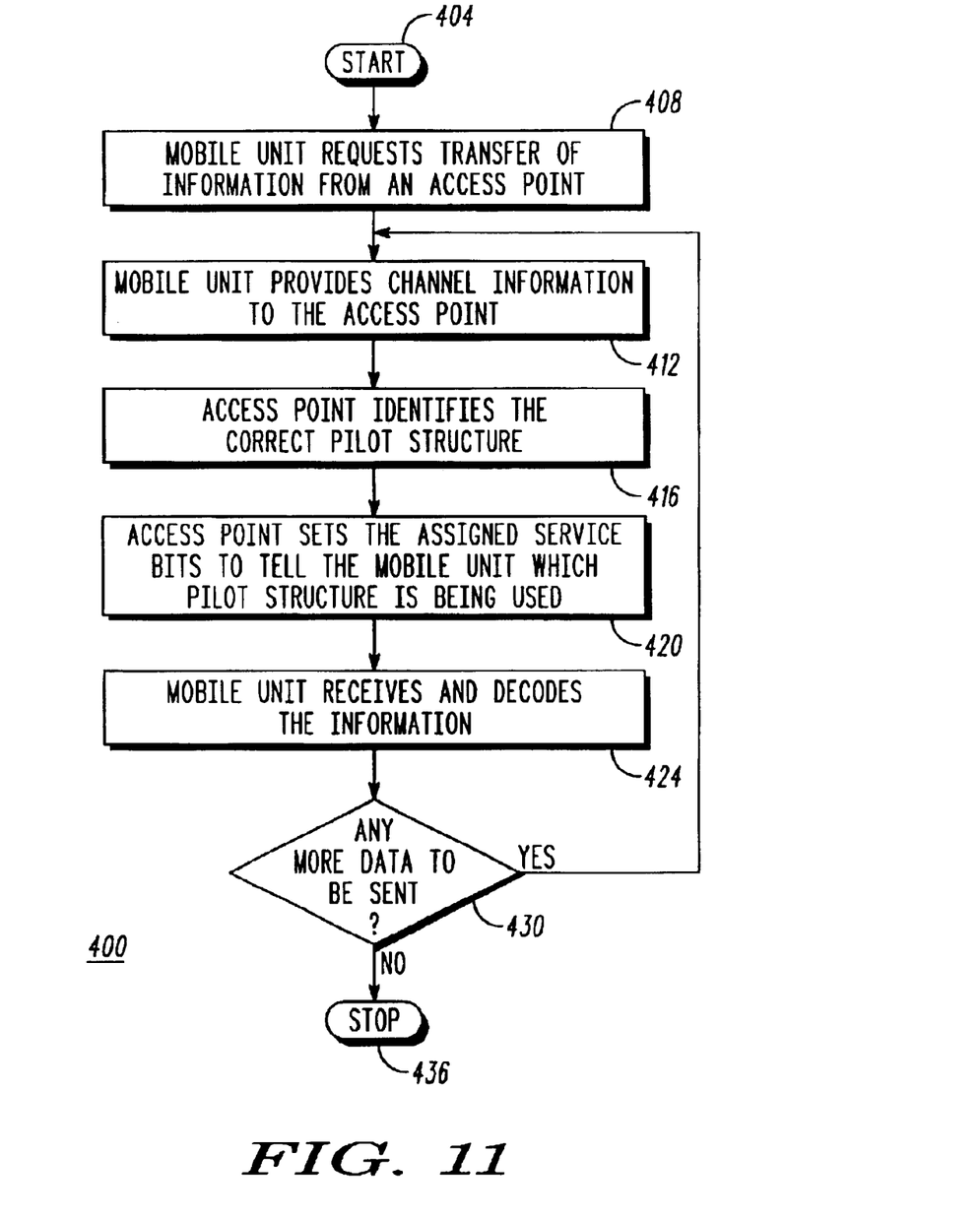
FIG. 11 is a flow chart describing one embodiment of a process for pilot pattern selection consistent with certain embodiments of the present invention.

FIGS. 9 and 10 show the 802.11a/RA PPDU [PLCP (Physical Layer Convergence Procedure) Protocol Data Unit] frame format and the bit assignment in the SERVICE field respectively. The 802.11a/RA MAC and PHY layer specifications indicate that the last nine bits (7–15) in the SERVICE field are reserved for future use. Therefore, the access point could use one or more of these bits in order to let the mobile unit know which pilot structure it is sending. In addition, the mobile unit could help the access point choose the right pilot structure by providing some information regarding the channel conditions (e.g., vehicle speed or error rate). The flowchart of FIG. 11 illustrates one exemplary process 400 for adapting the pilot pattern in accordance with certain embodiments consistent with the present invention, but should not be considered limiting.

The process 400 starts at 404 after which the mobile unit requests a transfer of information from the access point at 408. The Mobile unit provides channel information to the access point at 412. The access point identifies the correct pilot structure at 416 and sets the assigned service data bits to tell the mobile unit which pilot structure is being used at 420. The mobile unit receives and decodes the information at 424 and if further data is to be transmitted at 430, control returns to 412. Otherwise, control passes to 436 where the process ends. Those skilled in the art will appreciate that many variations of this process are possible without departing from the present invention.

Thus, an OFDM communication method, consistent with certain embodiments of the present invention establishes a pattern of pilot symbols to substitute for data symbols in a transmitted OFDM data packet; identifies the pattern of pilot symbols by a code and transmits the code to an OFDM receiver. At the OFDM receiver, the code that identifies a pattern of pilot symbols substituted for data symbols in a transmitted OFDM data packet is received and translated to the pattern of pilot symbols. Arbitrary data symbols such as random data symbols are substituted for the pilot symbols, and the data symbols are decoded. Thus, the transmitter produces an OFDM carrier wave that carries a plurality of OFDM data symbols along with a pattern of pilot symbols substituted for data symbols and a segment of code identifying the pattern of pilot symbols, that are all packaged within a packet structure. Many variations of this process consistent with embodiments of the present invention will occur to those skilled in the art upon review of the present disclosure.

A simulation was conducted to compare the effect of a Doppler frequency spread in a scattering mode mobile environment are used with the IEEE 802.11a pilot structure versus a linear pilot structure similar to that described above in connection with FIG. 3. The boundary values of $M_t$ and $M_f$ are shown in TABLE 3 below.

TABLE 3

| Vehicle Velocity | $M_t/M_f$ (Integers) |
| --- | --- |
| 3 mph | 2369/4 |
| 25 mph | 284/4 |
| 45 mph | 157/4 |
| 65 mph | 109/4 |

To avoid under-sampling, both the values of $M_t$ and $M_f$ should be smaller than the ones given in TABLE 3. In the simulation, the values of $M_t$ and $M_f$ were set at twenty-four and two, respectively. A Wide Sense Stationary Uncorrelated Scattering (WSSUS) channel model as proposed by Peter Hoeher in "A Statistical Discrete-Time Model for the WSSUS Multipath Channel", from IEEE Transactions on Vehicular Technology, Volume 41, No. 4, November 1992 was used in this simulation. No attempt was made to optimize the pilot symbols used. If the frequency correction symbols are not being used as pilots, then 24 (48/2) pilots are placed in a time span of twenty-four OFDM symbols. In order to take advantage of the frequency interleaving process used in the 802.11a/RA PHY layer, only one pilot was allowed per OFDM symbol. Therefore, a minimum of twenty-four symbols (288 bytes) is used per packet. The results obtained using this linear pattern is compared with those obtained using the current 802.11a/RA pilot structure. The simulation was run at 5.9 GHz, which produces the parameters given by TABLE 4 below.

TABLE 4

| Parameter | Parameter Value |
| --- | --- |
| $T_{FFT}$ - OFDM symbol duration | 6.4 μs |
| $T_G$ - Cyclic Extension | 1.6 μs |
| $T_S$ - Sampling Period | 10e−7 s/sample |

TABLE 4-continued

| Parameter | Parameter Value |
|---|---|
| $F_{SC}$ - Subcarrier Spacing | 156.25 kHz |
| $F_{Drel}$ - Relative Doppler Frequency | 3 mph - 1.69e−4 |
| | 25 mph - 1.41e−3 |
| | 45 mph - 2.53e−3 |
| | 65 mph - 3.66e−3 |

The simulation results, using soft decision Viterbi decoding, are tabulated below with TABLE 5 representing results using the IEEE 802.11a pilot structure and TABLE 6 representing results using a linear pilot structure consistent with certain embodiments of the present invention. Hard decision Viterbi decoding also yielded improvements, although not as significant as with soft decision Viterbi decoding. It should be noted that many variables can be manipulated in such a simulation and variations in simulation results can be expected as different parameters are used in such a simulation. However, the results obtained provide clear evidence of striking improvement obtainable using embodiments of the present invention in high Doppler environments.

TABLE 5

| RICEAN FACTOR (db) | PER at 3 mph | PER at 25 mph | PER at 45 mph |
|---|---|---|---|
| Rayleigh | 0.2% @ 24 sym./packet | 4.2% @ 24 sym./packet | 20.1% @ 24 sym./packet |
| | 0.4% @ 72 sym./packet | 47.7% @ 72 sym./packet | 86.0% @ 72 sym./packet |
| | 2.0% @ 120 sym./packet | 77.6% @ 120 sym./packet | 97.7% @ 120 sym./packet |
| | 3.3% @ 168 sym./packet | 92.8% @ 168 sym./packet | 99.6% @ 168 sym./packet |
| 6 | 0.46% @ 24 sym./packet | 1.3% @ 24 sym./packet | 9.0% @ 24 sym./packet |
| | 0.46% @ 72 sym./packet | 39.5% @ 72 sym./packet | 77.1% @ 72 sym./packet |
| | 0.53 @ 120 sym./packet | 72.7% @ 120 sym./packet | 92.5% @ 120 sym./packet |
| | 1.5% @ 168 sym./packet | 84.9% @ 168 sym./packet | 96.1% @ 168 sym./packet |
| 10 | 0.33% @ 24 sym./packet | 1.1% @ 24 sym./packet | 5.5% @ 24 sym./packet |
| | 0.13% @ 72 sym./packet | 36.2% @ 72 sym./packet | 74.3% @ 72 sym./packet |
| | 0.60% @ 120 sym./packet | 68.5% @ 120 sym./packet | 87.3% @ 120 sym./packet |
| | 0.67% @ 168 sym./packet | 82.4% @ 168 sym./packet | 93.0% @ 168 sym./packet |

TABLE 6

| RICEAN FACTOR (db) | PER at 3 mph | PER at 25 mph | PER at 45 mph |
|---|---|---|---|
| Rayleigh | 1.3% @ 24 sym./packet | 3.4% @ 24 sym./packet | 6.3% @ 24 sym./packet |
| | 1.7% @ 72 sym./packet | 4.1% @ 72 sym./packet | 11.2% @ 72 sym./packet |
| | 1.9% @ 120 sym./packet | 5.8% @ 120 sym./packet | 16.4% @ 120 sym./packet |
| | 2.5% @ 168 sym./packet | 5.5% @ 168 sym./packet | 18.9% @ 168 sym./packet |
| 6 | 1.8% @ 24 sym./packet | 1.7% @ 24 sym./packet | 3.3% @ 24 sym./packet |
| | 2.6% @ 72 sym./packet | 2.5% @ 72 sym./packet | 5.3% @ 72 sym./packet |
| | 2.1% @ 120 sym./packet | 3.6% @ 120 sym./packet | 5.7% @ 120 sym./packet |
| | 3.0% @ 168 sym./packet | 3.9% @ 168 sym./packet | 7.4% @ 168 sym./packet |
| 10 | 1.7% @ 24 sym./packet | 1.7% @ 24 sym./packet | 2.1% @ 24 sym./packet |
| | 1.8% @ 72 sym./packet | 2.1% @ 72 sym./packet | 4.0% @ 72 sym./packet |
| | 2.5% @ 120 sym./packet | 3.3% @ 120 sym./packet | 5.0% @ 120 sym./packet |
| | 1.8% @ 168 sym./packet | 3.3% @ 168 sym./packet | 4.1% @ 168 sym./packet |

Comparing TABLES 5 and 6, it can be seen that Packet Error Rates (PER) are improved dramatically as velocity increases using the linear pilot structure. In the worst case, at low velocities (3 MPH) with small packets (24 symbols per packet) and high ratios of reflected to incident received signals (Rayleigh), the linear pilot structure results in an increase in packet errors from about 0.2% to 1.3%. However, at 3 MPH with larger packets (168 symbols per packet), the packet error rate becomes more comparable, with the linear pilot pattern resulting in an enhancement from about 3.3% to about 2.5%. However, when larger packet sizes are used in a higher velocity environment, the improvement obtained using the linear pilot pattern is dramatic. For 168 symbol packets and Rayleigh Ricean factor at 45 miles per hour, the linear pilot pattern improves the packet error rate from 99.6% to 18.9%—effectively rendering an otherwise unusable communication scenario quite usable. Moreover, this enhancement is accomplished without reduction of the packet size. It should also be noted that this improvement is obtained in spite of a simulated scattering environment that is likely approaching worst case. When reflected energy is six db down from incident energy, the IEEE 802.11a pilot pattern still results in a 96.1% packet error rate with 168 symbol packets while the packet error rate for the linear pilot pattern simulation is only 7.4%.

The standardized OFDM system of IEEE 802.11a and IEEE 802.11a/RA should lend themselves to application of certain embodiments of the present invention without a great deal of modification. However, those skilled in the art will understand upon consideration of the present teaching that the principles of the present invention can be applied to many other OFDM systems to enhance performance in a mobile environment. Thus, although IEEE 802.11a has been used as an exemplary platform for explanation of the present invention, the invention in not limited to IEEE 802.11a systems and those derived therefrom. Moreover, although the exemplary embodiments presented herein continue to utilize the original pilot structure of IEEE 802.11a, this should not be considered limiting since the present invention is compatible with many alternative pilot structures and is not dependent thereon.

Although the present invention has been illustrated in terms of an OFDM system, those skilled in the art will appreciate that the techniques described herein are equally applicable to any sequential single carrier modulation system that can utilize a pilot signal in place of data to thereby induce intentional errors that are corrected by the receiver. Thus, any such system is intended to fall within the scope of the present invention. Moreover, the present invention as exemplified herein assumes that all data are equally important. Thus, substitution of pilots for data can be carried out without regard for the importance of the data in which errors are being induced. However, this is not always the case. For example, in the case of digitized voice, certain data is generally considered more important than others. In such a case, it might be advantageous to induce errors in the less important data. Such embodiments are contemplated by the present invention in determination of appropriate locations for insertion of pilots. It is also contemplated that a feedback mechanism can be established in order to determine the density of the pilot pattern substitution. In such a case, a bit error rate at the receiver, or any other suitable measurement, can be used to convey a selection of pilot pattern to the transmitter. Such mechanisms are contemplated by the present invention.

Those skilled in the art will recognize that the present invention has been described in terms of exemplary embodiments based upon use of a programmed digital signal processor (DSP) carrying out FFT and IFFT operations (as well as possibly other operations such as Viterbi decoding, interleaving, convolutional encoding, etc.) defined by a computer program. Other operations within the system, such as the substitution of pilot symbols for OFDM data symbols may be carried out with the use of a programmed computer or DSP. However, the invention should not be so limited, since the present invention could be implemented using hardware component equivalents such as special purpose hardware and/or dedicated or general purpose processors which are equivalents to the invention as described and claimed. Similarly, general purpose computers, microprocessor based computers, microcontrollers, optical computers, analog computers, digital signal processors, dedicated processors and/or dedicated hard wired logic may be used to construct alternative equivalent embodiments of the present invention.

Those skilled in the art will appreciate that, the program steps and associated data used to implement the embodiments described above can be implemented using any suitable electronic storage medium such as for example disc storage, Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above in flow chart form that can be stored on any suitable electronic storage medium (e.g., disc storage, optical storage, semiconductor storage, etc.) or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

Although the present invention has been described in terms of a wireless data communication system, the present invention is equally applicable to speech or video systems.

The technology can also be applied to communication systems based on wire, optical or other media without departing from the invention.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. An orthogonal frequency division multiplexing (OFDM) transmitter method, comprising:

arranging OFDM data symbols representing data bits for transmission in a packet;

removing at least one data symbol and replacing the removed data symbol with a pilot symbol; and transmitting the packet.

2. An orthogonal frequency division multiplexing transmitter method in accordance with claim 1, wherein the removing and replacing introduces the likelihood of a data error.

3. An orthogonal frequency division multiplexing transmitter method in accordance with claim 1, wherein the removing comprises removing a plurality of data symbols in a prescribed pattern, and wherein the replacing comprises replacing the plurality of data symbols with a plurality of pilot symbols.

4. An orthogonal frequency division multiplexing transmitter method in accordance with claim 3, wherein the prescribed pattern comprises a linear pattern.

5. An orthogonal frequency division multiplexing transmitter method in accordance with claim 3, further comprising:

encoding the data bits with an error correction coding, wherein the prescribed pattern is selected to produce no more errors than the error correction code can correct.

6. An orthogonal frequency division multiplexing transmitter method in accordance with claim 3, further comprising transmitting information conveying the prescribed pattern.

7. An orthogonal frequency division multiplexing transmitter method in accordance with claim 3, wherein the prescribed pattern is selected by a receiver receiving transmitted packets from the transmitter.

8. An orthogonal frequency division multiplexing transmitter method in accordance with claim 3, wherein the pilot symbols in the prescribed pattern of pilot symbols have a minimum spacing in time given by:

$$M_t < \frac{1}{2 f_{Drel}\left(1 + \frac{T_G}{T}\right)}$$

where:

T=the effective symbol length=$NT_S$, $T_S$ is the sampling period of the system, N is the number of subcarriers, $T_G$ is the length of cyclic prefix, The total symbol length=$T+T_G$, and $F_{Drel}$=a relative Doppler frequency.

9. An orthogonal frequency division multiplexing transmitter method in accordance with claim 3, wherein the pilot symbols in the prescribed pattern of pilot symbols have a minimum spacing in subchannels given by:

$$M_f < \frac{T}{T_G}$$

where:
T=the effective symbol length=$NT_S$,
$T_S$ is the sampling period of the system,
N is the number of subcarriers,
$T_G$ is the length of cyclic prefix, and
the total symbol length=$T+T_G$.

10. An orthogonal frequency division multiplexing (OFDM) receiver method, comprising:
  receiving a packet containing a plurality of OFDM symbols representing data, wherein at least one of the OFDM data symbols has been replaced with a pilot symbol of a pilot pattern comprising at least one pilot symbol;
  determining a channel correction factor from the pilot pattern;
  estimating a plurality of channel correction factors, one for each of the plurality of OFDM symbols representing data;
  correcting the OFDM symbols representing data using the plurality of channel correction factors; and
  decoding the OFDM symbols representing data using an error correction decoder.

11. An orthogonal frequency division multiplexing receiver method in accordance with claim 10, further comprising replacing the pilot pattern with arbitrary data prior to decoding.

12. An orthogonal frequency division multiplexing receiver method in accordance with claim 10, wherein a plurality of OFDM data symbols have been replaced with pilot symbols in a prescribed pattern.

13. An orthogonal frequency division multiplexing receiver method in accordance with claim 12, wherein the prescribed pattern comprises a linear pattern.

14. An orthogonal frequency division multiplexing receiver method in accordance with claim 12, wherein the OFDM data symbols represent data bits that have been encoded with an error correction coding, and wherein the prescribed pattern is selected to produce no more errors than the error correction decoder can correct.

15. An orthogonal frequency division multiplexing receiver method in accordance with claim 12, further comprising receiving information conveying the prescribed pattern.

16. An orthogonal frequency division multiplexing receiver method in accordance with claim 10, wherein the estimating comprises applying coherent time approximations to the plurality of channel correction factors for time periods shorter than a length of the packet.

17. An orthogonal frequency division multiplexing receiver method in accordance with claim 10, wherein the estimating comprises applying coherent frequency approximations to the plurality of correction factors for frequencies within two subcarrier frequencies of a frequency occupied by one of the at least one pilot symbols of the pilot pattern.

18. An orthogonal frequency division multiplexing receiver method in accordance with claim 10, further comprising selecting the pilot pattern and transmitting a signal indicative of the selected pilot pattern for use by a transmitter that transmits the packet containing the plurality of OFDM symbols.

19. An orthogonal frequency division multiplexing (OFDM) transmitter, comprising:
  a binary data to complex symbol mapper that maps a binary input representing a packet of information to a stream of constellation symbols;
  a serial to parallel converter that converts the stream of constellation symbols to a parallel collection of data symbols;
  a pilot substitutor that removes at least one data symbol and replaces the removed data symbol with a pilot symbol; and
  an inverse Fast Fourier Transformer (FFT) that receives the collection of data symbols and the pilot symbol as inputs and produces an OFDM output signal.

20. An orthogonal frequency division multiplexing transmitter in accordance with claim 19, wherein the pilot substitutor removes a plurality of data symbols in a prescribed pattern and replaces the data symbols with pilot symbols.

21. An orthogonal frequency division multiplexing transmitter in accordance with claim 20, wherein the prescribed pattern comprises a linear pattern.

22. An orthogonal frequency division multiplexing transmitter in accordance with claim 21, further comprising an error correction encoder that encodes the binary input with an error correction code and produces an output to the binary data to complex symbol mapper.

23. An orthogonal frequency division multiplexing transmitter in accordance with claim 22, wherein the prescribed pattern is selected to produce no more errors than the error correction code can correct.

24. An orthogonal frequency division multiplexing transmitter in accordance with claim 20, wherein the prescribed pattern is selected by a receiver receiving transmitted packets from the transmitter.

25. An orthogonal frequency division multiplexing transmitter in accordance with claim 22, further comprising an interleaver that interleaves the output of the error correction encoder and sends the interleaved output to the binary data to complex symbol mapper.

26. An orthogonal frequency division multiplexing transmitter in accordance with claim 20, further comprising means for transmitting information conveying the prescribed pattern.

27. An orthogonal frequency division multiplexing transmitter in accordance with claim 20, wherein the pilot symbols in the prescribed pattern of pilot symbols have a minimum spacing in time given by:

$$M_t < \frac{1}{2 f_{Drel}\left(1 + \frac{T_G}{T}\right)}$$

where:
T=the effective symbol length=$NT_S$,
$T_S$ is the sampling period of the system,
N is the number of subcarriers,
$T_G$ is the length of cyclic prefix,
The total symbol length=$T+T_G$, and
$F_{Drel}$=a relative Doppler frequency.-

28. An orthogonal frequency division multiplexing transmitter in accordance with claim 20, wherein the pilot symbols in the prescribed pattern of pilot symbols have a minimum spacing in subchannels given by:

$$M_f < \frac{T}{T_G}$$

where:
T=the effective symbol length=$NT_S$,
$T_S$ is the sampling period of the system,
N is the number of subcarriers,
$T_G$ is the length of cyclic prefix, and
the total symbol length=$T+T_G$.

29. An orthogonal frequency division multiplexing (OFDM) receiver, comprising:
   an OFDM receiver that receives a packet containing a plurality of OFDM symbols representing data, wherein at least one of the OFDM data symbols has been replaced with a pilot symbol of a pilot pattern comprising at least one pilot symbol;
   a Fast Fourier Transformer receiving the OFDM symbols;
   a channel estimator that estimates a channel correction factor from the pilot pattern and estimates a plurality of channel correction factors, one for each of the plurality of OFDM symbols representing data;
   a channel corrector that corrects the OFDM symbols representing data using the plurality of channel correction factors; and
   a decoder that decodes the OFDM symbols representing data using an error correction decoder.

30. An orthogonal frequency division multiplexing receiver in accordance with claim 29, further comprising a pilot to arbitrary data substitutor that replaces the pilot pattern with arbitrary data prior to the decoder.

31. An orthogonal frequency division multiplexing receiver in accordance with claim 29, wherein a plurality of OFDM data symbols have been replaced with pilot symbols in a prescribed pattern.

32. An orthogonal frequency division multiplexing receiver in accordance with claim 31, wherein the prescribed pattern comprises a linear pattern.

33. An orthogonal frequency division multiplexing receiver in accordance with claim 31, wherein the OFDM data symbols represent data bits that have been encoded with an error correction coding, and wherein the prescribed pattern is selected to produce no more errors than the error correction decoder can correct.

34. An orthogonal frequency division multiplexing receiver in accordance with claim 29, further comprising means for receiving information conveying the prescribed pattern.

35. An orthogonal frequency division multiplexing receiver in accordance with claim 34, wherein the information conveying the prescribed pattern is conveyed as service data within an OFDM packet structure.

36. An orthogonal frequency division multiplexing receiver in accordance with claim 29, wherein the channel estimator estimates the channel correction factors by applying coherent time approximations to the correction factors for time periods shorter than a length of the packet.

37. An orthogonal frequency division multiplexing receiver in accordance with claim 29, wherein the channel estimator estimates the channel correction factors by applying coherent frequency approximations to plurality of the correction factors for frequencies within two subcarrier frequencies of a frequency occupied by one of at least one pilot symbols of the pilot pattern.

38. An orthogonal frequency division multiplexing (OFDM) communication method, comprising:
   at an OFDM transmitter, establishing a pattern of pilot symbols to substitute for data symbols in a transmitted OFDM data packet;
   identifying the pattern of pilot symbols by a code; and
   transmitting the code to an OFDM receiver.

39. The orthogonal frequency division multiplexing communication method according to claim 38, wherein the code is embedded in a packet SERVICE code.

40. The orthogonal frequency division multiplexing communication method according to claim 38, wherein the code forms a part of a packet length code.

41. The orthogonal frequency division multiplexing communication method according to claim 39, wherein the pattern of pilot symbols comprises a linear pattern.

42. An orthogonal frequency division multiplexing (OFDM) communication method, comprising:
   at an OFDM receiver, receiving a code that identifies a pattern of pilot symbols substituted for data symbols in a transmitted OFDM data packet;
   translating the code to the pattern of pilot symbols;
   substituting arbitrary data symbols for pilot symbols received according to the pattern of pilot symbols; and
   decoding the data symbols.

43. The orthogonal frequency division multiplexing communication method according to claim 42, wherein the code is embedded in a packet SERVICE code.

44. The orthogonal frequency division multiplexing communication method according to claim 42, wherein the code forms a part of a packet length code.

45. The orthogonal frequency division multiplexing communication method according to claim 42, wherein the pattern of pilot symbols comprises a linear pattern.

46. An orthogonal frequency division multiplexing (OFDM) carrier wave, comprising:
   a plurality of OFDM data symbols;
   a pattern of pilot symbols substituted for data symbols; and
   a segment of code identifying the pattern of pilot symbols.

47. The orthogonal frequency division multiplexing carrier wave according to claim 46, wherein the plurality of OFDM data symbols, the pattern of pilot symbols and the segment of code are arranged in a packet.

48. The orthogonal frequency division multiplexing carrier wave according to claim 47, wherein the segment of code is embedded in a packet SERVICE code.

49. The orthogonal frequency division multiplexing carrier wave according to claim 47, wherein the segment of code forms a part of a packet length code.

50. The orthogonal frequency division multiplexing carrier wave according to claim 46, wherein the pattern of pilot symbols comprises a linear pattern.

51. A transmitter method, comprising:
   arranging data symbols representing data bits for transmission in a packet;
   removing at least one data symbol and replacing the removed data symbol with a pilot symbol and thus introducing a likelihood of a data error; and
   transmitting the packet.

52. A transmitter method in accordance with claim 51, wherein the removing comprises removing a plurality of data symbols in a prescribed pattern, and wherein the replacing comprises replacing the plurality of data symbols with a plurality of pilot symbols.

53. A transmitter method in accordance with claim 52, further comprising transmitting information conveying the prescribed pattern.

54. A transmitter method in accordance with claim 52, wherein the prescribed pattern is selected by a receiver receiving transmitted packets from the transmitter.

55. A receiver method, comprising:
   receiving a packet containing a plurality of data symbols, wherein at least one of the data symbols has been replaced with a pilot symbol of a pilot pattern comprising at least one pilot symbol;
   determining a channel correction factor from the pilot pattern;
   estimating a plurality of channel correction factors;
   correcting the data symbols using the plurality of channel correction factors; and
   decoding the data symbols using an error correction decoder.

56. A receiver method in accordance with claim 55, further comprising replacing the pilot pattern with arbitrary data prior to decoding.

57. A receiver method in accordance with claim 55, wherein the data symbols represent data bits that have been encoded with an error correction coding, and wherein the pilot pattern is selected to produce no more errors than the error correction decoder can correct.

58. A receiver method in accordance with claim 55, further comprising receiving information conveying the pilot pattern.

59. A receiver method in accordance with claim 55, further comprising selecting the pilot pattern and transmitting a signal indicative of the pilot pattern for use by a transmitter transmitting the packet containing the plurality of data symbols.

* * * * *